(12) United States Patent
Jacobsen

(10) Patent No.: US 6,284,098 B1
(45) Date of Patent: Sep. 4, 2001

(54) LIGNOCELLULOSE FIBER FILLER FOR THERMOPLASTIC COMPOSITE COMPOSITIONS

(75) Inventor: William W. Jacobsen, Winston-Salem, NC (US)

(73) Assignee: WWJ, LLC, Statesville, NC (US)

( * ) Notice: Subject to any disclaimer, the term of this patent is extended or adjusted under 35 U.S.C. 154(b) by 0 days.

(21) Appl. No.: 09/119,257

(22) Filed: Jul. 20, 1998

(51) Int. Cl.$^7$ ..................................................... D21H 11/00
(52) U.S. Cl. ................................ 162/150; 162/55; 162/91
(58) Field of Search ............................... 162/150, 21, 91, 162/55

(56) References Cited

U.S. PATENT DOCUMENTS

| | | |
|---|---|---|
| 2,642,359 * | 6/1953 | Scott ..................................... 162/150 |
| 2,757,150 * | 7/1956 | Heritage ................................ 162/11 |
| 3,943,079 | 3/1976 | Hamed . |
| 4,003,866 | 1/1977 | Paturle . |
| 4,035,550 | 7/1977 | Suh et al. . |
| 4,100,328 | 7/1978 | Gallagher . |
| 4,144,304 | 3/1979 | Dereppe et al. . |
| 4,203,876 | 5/1980 | Dereppe et al. . |
| 4,248,743 | 2/1981 | Goettler . |
| 4,263,184 | 4/1981 | Leo et al. . |
| 4,297,253 | 10/1981 | Sorbier . |
| 4,323,625 | 4/1982 | Coran et al. . |
| 4,361,662 | 11/1982 | Gaul et al. . |
| 4,376,144 | 3/1983 | Goettler . |
| 4,379,190 | 4/1983 | Schenck . |
| 4,380,522 | 4/1983 | Georlette et al. . |
| 4,393,154 | 7/1983 | Tyler et al. . |
| 4,414,267 | 11/1983 | Coran et al. . |
| 4,433,813 | 2/1984 | Whatton et al. ..................... 241/21 |
| 4,472,545 | 9/1984 | Coughlin et al. . |
| 4,474,846 | 10/1984 | Doerer et al. . |
| 4,478,966 | 10/1984 | Helgesson et al. . |
| 4,480,061 | 10/1984 | Coughlin et al. . |
| 4,496,718 | 1/1985 | Rudy . |
| 4,508,860 | 4/1985 | Hawes . |
| 4,528,309 | 7/1985 | Gote et al. . |
| 4,543,377 | 9/1985 | Crossman . |
| 4,559,376 | 12/1985 | Kubat et al. . |
| 4,686,257 | 8/1987 | Mitsuno et al. . |
| 4,687,793 | 8/1987 | Motegi et al. . |
| 4,717,743 | 1/1988 | Wakabayashi et al. . |
| 4,746,688 | 5/1988 | Bistak et al. . |
| 4,783,493 | 11/1988 | Motegi et al. . |
| 4,820,749 | 4/1989 | Beshay . |
| 4,822,826 | 4/1989 | Pommier et al. . |
| 4,828,913 | 5/1989 | Kiss . |
| 4,833,181 | 5/1989 | Narukawa et al. . |
| 4,882,112 | 11/1989 | Maki et al. . |
| 5,008,310 | 4/1991 | Beshay . |
| 5,082,605 | 1/1992 | Brooks et al. . |
| 5,096,945 | 3/1992 | Sun . |
| 5,120,776 | 6/1992 | Raj et al. . |
| 5,130,352 | 7/1992 | Chow . |
| 5,153,241 | 10/1992 | Beshay . |
| 5,153,243 | 10/1992 | Kimura et al. . |
| 5,155,147 | 10/1992 | Dietz et al. . |
| 5,164,432 | 11/1992 | Dehennau et al. . |
| 5,194,461 | 3/1993 | Bergquist et al. . |
| 5,288,775 | 2/1994 | Bischoff et al. . |
| 5,306,550 | 4/1994 | Nishiyama et al. . |
| 5,330,828 * | 7/1994 | Jacobsen, Jr. et al. ................ 428/19 |
| 5,340,642 | 8/1994 | Baumgartl et al. . |
| 5,435,954 | 7/1995 | Wold . |
| 5,480,602 | 1/1996 | Nagaich . |
| 5,486,553 | 1/1996 | Deaner et al. . |
| 5,502,088 | 3/1996 | Hododi . |
| 5,539,027 | 7/1996 | Deaner et al. . |
| 5,585,054 | 12/1996 | Evans . |
| 5,624,616 | 4/1997 | Brooks . |
| 5,723,522 | 3/1998 | Bergmann . |
| 5,773,138 | 6/1998 | Seethamraju et al. ............... 428/326 |
| 5,776,281 | 7/1998 | Evans . |
| 5,780,519 | 7/1998 | Imoto . |

FOREIGN PATENT DOCUMENTS

| | | |
|---|---|---|
| 0319589 | 6/1989 | (EP) . |
| 1590046 | 5/1981 | (GB) . |
| 9302240 | 11/1997 | (JP) . |
| 8302788 | 8/1983 | (WO) . |

\* cited by examiner

Primary Examiner—Jan H. Silbaugh
Assistant Examiner—Mark Eashoo
(74) Attorney, Agent, or Firm—Moore & Van Allen, PLLC; Michael G. Johnston

(57) ABSTRACT

A discontinuous lignocellulose fiber is described for use as a reinforcing filler for thermoplastic composite compositions. The fiber filler includes a significant percentage by weight of long, "hair-like" fibers. Specifically, at least about 20 percent by weight of the fiber filler is discontinuous lignocellulose fiber with a fiber length greater than about 15 millimeters and a fiber diameter less than about 0.5 millimeters. A moldable thermoplastic composite composition including the discontinuous lignocellulose fiber comprises about 20 to about 50 percent by weight of the fiber filler and about 50 to about 80 percent by weight thermoplastic. The discontinuous lignocellulose fiber filler yields thermoplastic composite compositions having improved physical properties over basic thermoplastic. The improved physical properties can be achieved without the use of coupling agents, although coupling agents may be used to further enhance the composite properties. The discontinuous lignocellulose fiber is preferably derived from virgin, waste wood from either softwood or hardwood tree species depending on the end use of the composite composition. The thermoplastic can be selected from a number of post-consumer or post-industrial waste sources. Processes for the manufacture of the discontinuous lignocellulose fiber reinforcing filler and the thermoplastic composite compositions are also disclosed.

9 Claims, No Drawings

LIGNOCELLULOSE FIBER FILLER FOR THERMOPLASTIC COMPOSITE COMPOSITIONS

CROSS-REFERENCES none

GOVERNMENT RIGHTS none

BACKGROUND

This invention relates generally to a reinforcement filler for thermoplastic composite compositions, and more particularly concerns a discontinuous lignocellulose fiber filler.

The intent of filled, reinforced thermoplastic composite technology is to create new materials and market applications by lowering the cost or improving the physical properties of thermoplastics. The cost and performance of the thermoplastic composites are generally a fiction of three variables: (1) the cost and performance of the composite materials, (2) the performance of the resultant composite matrix, and (3) the performance of the interfacial bond between the filler material and the thermoplastic material.

The art of incorporating discontinuous cellulose fiber or discontinuous lignocellulose fiber as a filler in thermoplastic resins to create moldable compositions is well known. Such compositions are known to yield moldable composite compositions with improved tensile strength and flexural properties.

Unfortunately, the physical properties of discontinuous cellulose fiber or discontinuous lignocellulose fiber filler have not, as yet, been addressed as a significant factor relative to the properties of the resultant thermoplastic composite. In fact, conventional fiber-filled thermoplastic composite compositions are relatively indiscriminate as to the source of the fiber, deriving the fiber filler from wood flour, wood chips, rice hulls, used paper, pulp, cellulose powder and mixtures thereof. Moreover, where a wood fiber source is used, the selection of softwood or hardwood to achieve desired end product performance properties is either indiscriminate or unnecessarily specific.

There is some evidence that the physical properties of the fiber filler and resultant thermoplastic composite vary as the source of fiber varies. For example, it is known that the Modulus of Rupture (MOR), a measure of composite brittleness, of discontinuous lignocellulose fiber thermoplastic composites is primarily a function of the source and nature of the discontinuous lignocellulose fiber. Specifically, using discontinuous lignocellulose fiber derived from chemically unaltered (hereafter referred to as "virgin") wood leads to thermoplastic composites possessing significantly higher MOR properties than thermoplastic composites filled with fiber from non-virgin or non-wood cellulose sources.

Further, discontinuous cellulose and lignocellulose fibers commonly used in thermoplastic composites are fine fibers, typically referred to as "wood flour" or "dust". However, longer discontinuous lignocellulose fibers have the capacity to withstand greater stress, and thus have greater tensile properties than shorter fibers of a similar nature. Under load, tensile stress transferred from the composite matrix to the fiber increases from zero at the end of fiber to a maximum value at the fiber's center. As the fiber length increases, the surface area of the fiber increases thereby increasing the distribution of applied stress. As the distributed loading of stress increases over the greater surface area of a longer discontinuous lignocellulose fiber, the amount of stress at a given load at the center of the fiber decreases. Consequently, a longer fiber can absorb greater stress prior to failure than a shorter fiber.

The performance of discontinuous lignocellulose fiber thermoplastic composites is also a function of the concentration of discontinuous lignocellulose fibers in the composite composition. For example, as the pulp wood fiber content in a polypropylene-fiber thermoplastic composite is increased, the tensile and flexural properties of the composition improve until a concentration of 50 percent pulp wood fiber by weight of the composite is reached. Beyond the 50 percent pulp wood fiber loading rate, the tensile and flexural properties of the composite declines.

Related to the concentration of discontinuous lignocellulose fibers in thermoplastic composite compositions is the volume of the fiber in the composite. Fiber volume is a function of the size of the discontinuous lignocellulose fiber and the density of the fiber. Fiber density is determined by the density of the tree species selected as the source of the fiber. At a given length and density, a fiber with a greater diameter will weigh more than a small diameter fiber of similar nature proportionate to the change in the fiber's surface area. However, as the weight of the individual fibers increases, the number of fibers at a given concentration in a thermoplastic composite composition decreases. This decrease of discontinuous lignocellulose fibers within the discontinuous lignocellulose fiber thermoplastic matrix reduces the number of discontinuous lignocellulose fiber and thermoplastic interfaces, which has the same effect as lowering the concentration of the discontinuous lignocellulose fibers in the composite resulting in a composite with reduced tensile and flexural performance.

Coupling agents are usually needed to improve the interfacial bond between the wood fibers and thermoplastic. The coupling agent effectively creates a bridge between the fibers and the thermoplastic which improves the tensile and flexural properties of the thermoplastic composite under load. However, the use of coupling agents adds to the cost of manufacturing the composite composition.

For the foregoing reasons, there is a need for an improved discontinuous lignocellulose fiber filler for thermoplastic composite compositions. The discontinuous lignocellulose fiber should include a relatively high percentage of long fibers to create a large surface area for interface between the fiber and the thermoplastic. The concentration of the new discontinuous lignocellulose fiber in the composite composition should yield increased tensile strength and flexural properties in the composite composition. The tensile and flexural properties of the composite product should improve as the percentage of long fibers are increased. Ideally, the source of the composite materials and manufacturing the discontinuous lignocellulose fiber and the composite composition are simple and cost effective.

SUMMARY

The present invention is a discontinuous lignocellulose fiber that satisfies these needs. A discontinuous lignocellulose fiber filler for thermoplastic compositions having features of the present invention includes a significant percentage by weight of long, "hair-like" fibers. Preferably, at least about 20 percent by weight of the fiber filler is discontinuous lignocellulose fiber with a fiber length greater than about 15 millimeters and a fiber diameter less than about 0.5 millimeters. A thermo-mechanical process is used for producing the subject discontinuous lignocellulose fiber, comprising the steps of conditioning wood chips under about 80 to about 100 psi of steam pressure for a period of about one to about four minutes, and mechanically separating the chips into individual discontinuous fibers.

A moldable thermoplastic composite composition including the discontinuous lignocellulose fiber of the present invention comprises about 20 to about 50 percent by weight of the fiber filler and about 50 to about 80 percent by weight thermoplastic. Optionally, the thermoplastic composite composition may further comprise up to about 10 percent by weight of a coupling agent. The composition is prepared by a process comprising the steps of blending the discontinuous lignocellulose fiber, thermoplastic, and coupling agent or other additives, extruding the blended materials at an extruder operating temperature of less than about 450° F., and forming the extruded composites into finished products by profile extrusion, cold compression molding, hot compression molding or injection molding.

Accordingly, it is an object of the present invention to provide a new discontinuous lignocellulose fiber for thermoplastic composite compositions having one of more of the novel features of this invention as set forth above or hereafter shown or described.

Another object of the present invention is to engineer discontinuous lignocellulose fibers to improve the physical properties of this component of the thermoplastic composite yielding cost effective composites with improved properties over basic thermoplastic. A related object of the present invention is to improve thermoplastic composite strength and stiffness properties by incorporating the new fiber filler, thereby creating compositions with properties suitable for a wide range of market applications that would include, but not be limited to, structural packaging, automotive interior trim, architectural components, furniture components, and the like.

A further object of the present invention is to produce improved thermoplastic composite compositions comprising the new discontinuous lignocellulose fiber filler without the need for coupling or bonding agents or other additives.

A feature of the invention is the size distribution of the discontinuous lignocellulose fiber reinforcing filler, which includes a high percentage by weight of long, hair-like fibers. The size distribution of the fiber as percent by total weight withheld on ASTM screens is about 20 to about 50 percent withheld on an eight mesh screen, about 20 to about 40 percent withheld on a sixteen mesh screen, about 20 to about 30 percent withheld on a fifty mesh screen, and about 10 percent finer than a fifty mesh screen. The discontinuous lignocellulose fiber is preferably derived from virgin, waste wood from either softwood or hardwood tree species, depending on the end use of the composite component. The thermoplastic can be selected from a number of post-consumer or post-industrial waste sources. Coupling agents are optional, but may be used to further enhance the tensile and flexural properties of the composite compositions.

The discontinuous lignocellulose fiber reinforcement filler of the present invention, when incorporated into thermoplastic composites at concentrations of at least about 20 percent by weight, improves the tensile and flexural properties of the thermoplastic and yields composite compositions with improved stiffness and strength properties. Moreover, the improved fiber filler and composite may be prepared using conventional manufacturing equipment and from wood waste and recycled thermoplastic thereby minimizing materials and manufacturing costs.

These and other features, objects and advantages of the present invention will become apparent with reference to the following description and appended claims.

DESCRIPTION

A discontinuous lignocellulose fiber is described for use as a reinforcing filler in thermoplastic composite compositions. The lignocellulose fiber of the present invention is derived from a virgin wood source using a thermo-mechanical process which yields a fiber filler having a predetermined size distribution, including a high percentage by weight of long, "hair-like" fibers. The discontinuous lignocellulose fiber filler is blended with thermoplastic and extruded to produce a composition having improved physical properties. A coupling agent may be used to improve the interfacial bond between the fiber and thermoplastic.

In accordance with the present invention, the source of the discontinuous lignocellulose fiber is a significant factor. Chemically unaltered, or "virgin", wood is the preferred source since, as discussed above, the MOR of the molded thermoplastic composite is enhanced. The virgin wood source may be either softwood or hardwood, depending on the desired composite performance properties. Softwood is preferred for composite applications requiring greater impact resistance, such as packaging and the like. Hardwood is preferred for applications requiring greater strength or stiffness, such as office chair seat backs and the like. Southern Pine and Poplar are the preferred representatives from the softwood and hardwood groups, respectively, due to lower cost and availability. However, within their respective groups, other tree species such as, but not limited to, Aspen, Birch, Cottonwood, Douglas Fir, Oak, Spruce, Loblolly Pine, and others are suitable for use as the fiber source in the present invention.

The preferred virgin wood source of Southern Pine or Poplar is wood waste, such as discarded pallets, furniture manufacturing scraps and the like. The primary reason is that wood waste has usually been previously air or kiln dried to a moisture content that ranges from about 7 to about 12 percent by weight. This is close to the typical moisture content for discontinuous lignocellulose fiber as a component of a thermoplastic composite of about 5 percent or less by weight. Composite compositions containing discontinuous lignocellulose cellulose fiber with moisture contents in excess of 5 percent by weight often yield molded products having visually unappealing blisters. Blistering is a result of conversion of the moisture within the fiber into steam during the extrusion step of the composite production process. Further, green wood mill chips have a moisture content which ranges from about 45 to about 50 percent by weight. Thus, drying wood waste to the appropriate moisture control content requires less energy than drying green wood mill chips, which decreases processing cost.

The discontinuous lignocellulose fiber filler of the present invention comprises a significant percentage by weight of long fibers, preferably exceeding about 15 millimeters. I have observed that as the concentration of long fibers in a thermoplastic composite composition increases, the tensile and flexural properties of the composite improve, regardless of tree species.

The preferred diameter of the long discontinuous lignocellulose fibers is between about 0.1 and about 0.5 millimeters. In this diameter range, the distribution of the discontinuous lignocellulose fibers in the discontinuous lignocellulose fiber thermoplastic composite matrix is optimized. Utilizing fibers with diameters in excess of about 0.5 millimeters is not desirable since, at a given length and weight concentration in the composite, the volume of discontinuous lignocellulose fibers would be reduced. For example, the volume of discontinuous lignocellulose fibers measuring one millimeter in diameter would be approximately one half that of fibers measuring 0.5 millimeters in diameter. This would reduce the number of fiber and thermoplastic interfaces by approximately 50 percent and result in a composite with decreased tensile and flexural performance. Moreover, to increase the weight concentration of a one millimeter diameter fiber to achieve comparable distribution properties in the composite to that of a smaller diameter fiber would result in a heavier composite composition. However, in many applications, such as automotive interior trim, it is undesirable to add weight to the end product.

A thermo-mechanical pulp process is used to derive the discontinuous lignocellulose fiber to achieve the preferred size distribution in the fiber filler. Thermo-mechanical fiber separation is preferred over mechanical fiber separation methods, such as hammer milling or stone grinding, because such mechanical fiber separation methods are incapable of producing the present invention's discontinuous lignocellulose fiber size distribution.

A suitable thermo-mechanical pulp process for preparing discontinuous lignocellulose fiber, particularly long, hair-like discontinuous lignocellulose fiber, is taught by the present inventor in U.S. Pat. No. 5,330,828 which issued Jul. 19, 1994, the contents of which are hereby incorporated by reference. The process is manipulated, as described below, to achieve a size distribution of discontinuous lignocellulose fibers whereby a significant percentage by weight of the discontinuous lignocellulose fibers have a length which exceeds about 15 millimeters and a diameter of less than about 0.5 millimeters.

In the process, wood chips are conditioned under pressure and mechanically separated into individual discontinuous fiber bundles, herein referred to as "fibers". The conditioning step consists of feeding either hardwood or softwood chips of similar species derived from wood mills or wood waste into a vessel pressurized with steam to between about 80 psi to about 100 psi for a period of about one to about four minutes. Residence time in the pressurized vessel for less than about one minute results in poor fiber separation resulting in fibers with diameters in excess of the preferred 0.5 millimeters. Residence time beyond four minutes yields no additional fiber separation benefits while slowing the production process.

The wood chips exit the pressurized vessel via a screw conveyor which is maintained at a pressure of about 65 to about 85 psi. The screw conveyor carries the pressurized wood chips to a Sunds Model 36-inch Defibrator refiner where the wood chips are mechanically separated under pressure into individual fibers by passing the pressurized wood chips between a static disc and a rotating disc. The distance between the rotating disc and the static disc is set at about 0.003 inches to about 0.010 inches, with a preferred rotating disc speed of about 1,200 RPM.

Discontinuous lignocellulose fiber produced by this process ranges in length from a few microns to about 30 millimeters, and in diameter from a few microns to about two millimeters. The resultant size distribution of the discontinuous lignocellulose fiber is preferred to be from about 20 to about 50 percent by weight retained on an eight mesh screen, from about 20 to about 40 percent by weight retained on a sixteen mesh screen, from about 20 to about 40 percent by weight retained on a fifty mesh screen and the remaining fiber fine enough to pass through a fifty mesh screen.

The fibers are subsequently dried to a moisture content of about 5 percent by weight. Any suitable dryer is used, such as a Procter and Schwartz gas burner, flash dryer. The discontinuous lignocellulose fiber preferably enters the dryer at a dryer temperature of about 380° F. and exits the dryer at a temperature of about 170° F. The discontinuous lignocellulose fiber residence time within the dryer is usually less than about one minute.

The thermoplastic component selected for use in the composite composition of the present invention is selected for its physical properties relative to the desired performance characteristics of the composite composition. The wide array of commercially available thermoplastics, such as polyethylenes, polypropylenes, ABS, and the like, possess different physical properties. For example, per ASTM D638, unfilled general purpose polystyrene has a tensile performance value ranging from 5000 to 8000 pounds per square inch compared to unfilled high density polyethylene with a tensile performance value ranging from 1400 to 4000 pounds per square inch. The notched Izod values of polystyrene per ASTM D256 range from 0.25 to 0.35 foot pounds per square inch compared to high density polyethylene with notched Izod values ranging from 0.4 to 6.0 foot pounds per square inch. Comparatively, polystyrene would be selected over high density polyethylene for applications requiring high strength. Conversely, high density polyethylene would be selected over polystyrene for applications requiring high impact properties.

The thermoplastic component may be derived from recycled or non-recycled thermoplastic sources. It is preferred to utilize recycled or waste thermoplastics due to the lower cost versus non-recycled thermoplastic. It is also desirable that the thermoplastic have a softening or melting temperatures less than about 450° F. Processing the lignocellulose fiber and thermoplastic blend at an extrusion temperature of more than about 450° F. could lead to burning of the discontinuous lignocellulose fiber, which causes the composite compositions to lose their advantageous physical properties. The thermoplastic is prepared according to any conventional method, such as grinding, shredding and pelletizing, and the like. Ideally, the thermoplastic pieces are less than about ¼ inches in all dimensions.

The steps for processing the component materials to yield the composite include low shear mechanical blending of the discontinuous lignocellulose fiber and thermoplastic and subsequent extrusion followed by profile forming, cold or hot compression molding or injection molding and cooling.

In the blending step, the discontinuous lignocellulose fiber is combined with the thermoplastic component in a low shear mixing device. Low shear devices are preferred in order to minimize discontinuous lignocellulose fiber fracturing and length reduction. The preferred concentration of discontinuous lignocellulose fiber filler in the thermoplastic composite composition of the present invention ranges from about 20 to about 50 percent by weight of the composite, depending on the desired physical properties of the composite. Composite molded products incorporating lignocellulose fiber filler at concentrations outside this range yield negligible tensile and structural property improvements and lose their hybrid properties. Molded products incorporating less than about 20 percent by weight of the discontinuous lignocellulose fiber filler of the present invention are more like the thermoplastic whereas, at concentrations at more than about 50 percent by weight, the products become wood-like, neither of which is a desired characteristic of a reinforced, filled thermoplastic.

Composite products molded from composite compositions prepared according to the present invention demonstrate improved tensile and flexural properties as the concentration of the discontinuous lignocellulose fiber filler increases within the above range. However, it has been observed that as the tensile and flexural properties improved, notched Izod properties declined. Consequently, the concentration of the discontinuous lignocellulose fiber filler in the composite is driven by the requirements of the application of the molded product for either flexibility or rigidity.

Additional components, such as coupling agents, foaming agents, coloring, U.V. stabilizers, and the like, may optionally be added to the composite during or prior to blending. As noted above, coupling agents are used, for example, to enhance the interfacial bond between the discontinuous lignocellulose fiber and the thermoplastic. When used for interfacial bond improvement in the composite composition of the present invention, the preferred coupling agents include maleated or maleic anhydride grafted polypropylene or polyethylene, ethylene methacrylic or acrylic acid. Maleic anhydride grafted polyethylene is the preferred coupling agent when polyethylene is the base resin of the thermoplastic composite. Maleic anhydride grafted polypropylene is the preferred coupling agent for composite compositions wherein the base resin is polypropylene. Based on the compatibility constraints observed between the maleated polyolefins and the base resin, ethylene methacrylic or acrylic acid is the preferred coupling agent when the base thermoplastic resin is a mixture of polyethylene and polypropylene (common in the use of post-consumer thermoplastic waste) or other thermoplastic resins or mixtures of thermoplastic resins with melting or softening temperatures below about 450° F. This would include, but not be limited to, polyvinyl chloride, polystyrene, polyanimides, polyester, ABS, and the like.

The amount of coupling agent in the composite composition is preferably up to about 10 percent by weight of the composite. Concentrations of the preferred coupling agents in excess of about 10 percent by weight yield little, if any, gain in the performance of the composite.

The compounded material is fed to an extruder. A single or twin screw extruder or a kinetic mixer may be utilized to soften the plastic and mix the composite components. A single screw extruder or kinetic mixer is preferred due to lower shear and less fiber fracturing. A Sterling six-inch bore extruder with a 34:1 screw compression ratio is suitable.

It is important that during extrusion the discontinuous lignocellulose fiber not be subjected to heat which is sufficient to burn the discontinuous lignocellulose fiber. Therefore, the material is preferably extruded at a temperature of between about 350° F. and about 450° F., and more preferably between 350° F. and 400° F. Extrusion temperatures in excess of 450° F. will burn the discontinuous lignocellulose fiber, resulting in deteriorated composite properties. Further, as the temperature of the extruded composite increases, cold compression mold cycle time increases, resulting in lower productivity and higher costs. Extrusion temperatures less than 350° F. fail to adequately reduce the viscosity of the thermoplastic, resulting in poor discontinuous lignocellulose fiber mixing and composite distribution. This contributes to a loss of composite tensile strength and flexural properties.

The extruded composite can be shaped into finished parts by a variety of means including, but not limited to, cold compression molding, hot compression molding, profile extrusion, injection molding, and the like. The thermal resistance of the discontinuous lignocellulose fiber of the present invention lowers the temperature of the extruded composite which results in quicker mold cycle times, thereby improving productivity and lowering cost. For example, cold compression molding of a molten extruded composite comprising 30 percent discontinuous lignocellulose fiber by weight of the composite results in mold cycle times that are about 10 to about 20 percent faster than those of the thermoplastic without the fiber filler.

Once extracted from profile extruders or compression mold presses, the finished composite parts can be either air or water cooled to ambient temperature prior to handling, storage, shipment or use.

The present invention is demonstrated by the following non-limiting examples.

TABLE I

| Ingredients (wt %) | Sample | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Southern Pine[1] | 30 | | 30 | 30 | | 30 | 30 | | | | | |
| Southern Pine[2] | | | | | 30 | | | | | | | |
| Poplar[3] | | | | | | | | 30 | | | | |
| Poplar[4] | | | | | | | | | 30 | | | |
| Poplar[5] | | | | | | | | | | | | 30 |
| Polyethylene[6] | 35 | 50 | 33.5 | 32 | 30 | 32.5 | 30 | 30 | 30 | 100 | | 30 |
| Polyethylene[7] | 35 | 50 | 33.5 | 32 | 30 | 32.5 | 30 | 30 | 30 | | 100 | 30 |
| Maleic Polypropylene[8] | | | 3 | 6 | | | | | | | | |
| Maleic Polyethylene[9] | | | | | | 5 | | | | | | |
| Ethylene Methacrylic[10] | | | | | 10 | | 10 | 10 | 10 | | | 10 |
| Total | 100 | 100 | 100 | 100 | 100 | 100 | 100 | 100 | 100 | 100 | 100 | 100 |

[1]Virgin Southern Pine thermo-mechanical pulp, 5 percent moisture content, fiber size expressed by grind distribution as a percentage by weight of which 13 to 18 percent greater than eight mesh screen, 60 to 77 percent finer than eight mesh screen but greater than fifty mesh screen, and 5 to 27 percent finer than fifty mesh screen.
[2]Virgin Southern Pine thermo-mechanical pulp, 5 percent moisture content, fiber size expressed by grind distribution as a percentage by weight of which 50 percent greater than eight mesh screen, 20 percent finer than eight mesh screen but greater than sixteen mesh screen, 20 percent finer than sixteen mesh screen but greater than fifty mesh screen, and 10 percent finer than fifty mesh screen.

TABLE I-continued

| | Sample | | | | | | | | | | | |
|---|---|---|---|---|---|---|---|---|---|---|---|---|
| Ingredients (wt %) | 1 | 2 | 3 | 4 | 5 | 6 | 7 | 8 | 9 | 10 | 11 | 12 |

[3]Virgin Poplar thermo-mechanical pulp, 5 percent moisture content, fiber size expressed by grind distribution as a percentage by weight of which 13 to 18 percent greater than eight mesh screen, 60 to 77 percent finer than eight mesh screen but greater than fifty mesh screen, and 5 to 27 percent finer than fifty mesh screen.
[4]Virgin Poplar thermo-mechanical pulp, 5 percent moisture content, fiber size expressed by grind distribution as a percentage by weight of which 50 percent greater than eight mesh screen, 20 percent finer than eight mesh screen but greater than sixteen mesh screen, 20 percent finer than sixteen mesh screen but greater than fifty mesh screen, and 10 percent finer than fifty mesh screen.
[5]Virgin Poplar kiln dried wood waste, 5 percent moisture content, fiber size expressed by grind distribution as a percentage by weight of which 50 percent greater than eight mesh screen, 20 percent finer than eight mesh screen but greater than sixteen mesh screen, 20 percent finer than sixteen mesh screen but greater than fifty mesh screen, and 10 percent finer than fifty mesh screen.
[6]Recycled polyethylene 0.34 lbs/in$^3$ density, 6.925 gm/10 min. melt flow rate per ASTM D 1238.
[7]Recycled polyethylene 0.34 lbs/in$^3$ density, 0.70 gm/10 min. melt flow rate per ASTM D 1238.
[8]Epolene G3003 by Eastman Chemical Company.
[9]Polybond 3009 by Uniroyal Chemical Corporation.
[10]Crystalene by Apex Specialty Polymers, Ltd.

The discontinuous lignocellulose fiber filler samples were prepared by conditioning wood chips from the listed sources in a pressure vessel for a period of between one and four minutes at a pressure of 80 psi to 100 psi. The conditioned chips were conveyed by screw conveyor at 65 psi to 85 psi to a Sunds Model 36-inch Defibrator and defibrated to the selected fiber size and fiber grind distribution. The discontinuous lignocellulose fibers were oven-dried to a moisture content of about 5 percent by weight.

All composite samples were prepared by blending the discontinuous lignocellulose fiber filler with thermoplastic, with or without coupling agents, at the concentrations listed in Table I in a low-shear mechanical mixing device. All samples were extruded through a Sterling six-inch bore extruder with a 34:1 screw compression ratio at 400° F., with the exception of Sample 6 which was extruded through a ZSK 30 millimeter twin screw extruder at 374° F. The extruded composite compositions were cold compression molded into test plaques. Test plaque mold temperatures ranged between 70° F. and 100° F. Mold cycle times were three minutes. All test plaques were aged a minimum of seventy-two hours prior to testing.

TABLE II

| ASTM Test | Performance Property | Sample 2 | Sample 10 | Sample 11 |
|---|---|---|---|---|
| 790-96 | Flexural Strength (MPa) | 14.5 | 16.1 | 12.3 |
| 790-96 | Flexural Modulus (MPa) | 680 | 640 | 460 |
| 256-93 | Notched Izod (J/M) | 154.9 | 49.3 | 174 |
| 638-96 | Tensile @ Break (MPa) | 18.6 | 11.6 | 15.4 |

Table II shows the physical properties of the thermoplastic samples.

TABLE III

| ASTM Test | Performance Property | Sample 1 | Sample 2 |
|---|---|---|---|
| 790-96 | Flexural Strength (MPa) | 23.8 | 14.5 |
| 790-96 | Flexural Modulus (MPa) | 1,288 | 680 |

Table III shows the improvement in flexural properties gained with the incorporation of the Southern Pine discontinuous lignocellulose reinforcing fiber filler at a concentration of 30 percent by weight into waste polyethylene without the use of coupling or bonding agents (Sample 1) over a polyethylene thermoplastic (Sample 2). The Sample 1 composition would be sufficient for applications requiring an improvement in stiffness over a thermoplastic.

TABLE IV

| ASTM Test | Performance Property | Sample 1 | Sample 2 | Sample 3 | Sample 4 | Sample 6 | Sample 7 |
|---|---|---|---|---|---|---|---|
| 790-96 | Flexural Strength (MPa) | 23.8 | 14.5 | 34 | 34.4 | 41.3 | 29 |
| 790-96 | Flexural Modulus (MPa) | 1288 | 680 | 1845 | 1871 | 1916 | 1390 |
| 638-96 | Tensile @ Break (MPa) | 14.6 | 18.6 | 21.5 | 19.9 | 33.1 | 17.8 |

Table IV shows the improvement in tensile and flexural properties of discontinuous lignocellulose fiber thermoplastic compositions with the addition of maleic anhydride grafted polypropylene (Samples 3 and 4), maleic anhydride grafted polyethylene (Sample 6) and ethylene methacrylic (Sample 7) coupling agents. With polyethylene as the base resin, the composite with maleic anhydride grafted polyethylene (Sample 6) demonstrated superior performance over similar composites with maleic anhydride grafted polypropylene (Samples 3 and 4). The composite with ethylene methacrylic as the coupling agent (Sample 7) did not demonstrate the same rate of improved tensile and flexural properties obtained with like composites consisting of maleated polypropylene and maleated polyethylene as coupling agents. Increasing the content of maleic anhydride grafted polypropylene from 3 to 6 percent by weight of the composite compositions, as in Samples 3 and 4, yielded little if any gain in the performance of the composite.

TABLE V

| ASTM Test | Performance Property | Sample 5 | Sample 7 | Sample 8 | Sample 9 | Sample 12 |
|---|---|---|---|---|---|---|
| 790-96a | Flexural Modulus (MPa) | 1,476 | 1,390 | 1,464 | 1,625 | 1,573 |
| 638-96 | Tensile @ Break (MPa) | 19.1 | 17.8 | 22.7 | 23.9 | 24.6 |
| 256-93a | Notched Izod (J/M) | 42.6 | 48.6 | 39.9 | 42.4 | 45.9 |

Table V shows the performance of composite samples having the same concentration of discontinuous lignocellulose cellulose fiber filler, but with varying concentrations of long fibers. The results indicate that, regardless of the tree species, as the percentage of discontinuous lignocellulose fibers with lengths in excess of fifteen millimeters was increased from 18 to 50 percent by weight within the polyethylene composite, the tensile properties of the composite improved. This improvement in tensile properties of the composite compositions with the greater percentage of long discontinuous lignocellulose fibers demonstrates that the long fibers of the discontinuous lignocellulose fiber filler of the present invention provide superior tensile properties over shorter fibers and particles.

Table V also shows that virgin wood fibers derived from softwood and hardwood species resulted in molded discontinuous lignocellulose fiber thermoplastic composite compositions with different properties. The composites including hardwood-derived fiber have superior tensile and flexural properties while the composites including softwood-derived fiber have superior Izod properties. Sample No. 7 derived from Southern Pine yields a composite with lower tensile (strength) and flexural (stiffness) properties, but greater Izod (impact) properties than Sample No. 9 which is an identical composition derived from Poplar.

Sample 12 demonstrates the comparable performance of discontinuous lignocellulose fiber thermoplastic composites wherein the fiber is derived from virgin kiln dried hardwood waste.

Sample Nos. 7 and 9 were cold compression molded into cable reel flanges measuring 36 inches in diameter by 1.5 inches in width. In destructive drop testing, the cable reel flanges produced according to the present invention withstood a 48" vertical drop carrying 700 pounds of cable without fracturing, fatigue or failure. Thus, in a practical application the present invention derived from virgin wood has demonstrated its ability to overcome the brittleness typical of wood filled thermoplastic compositions.

The previously described embodiments of the present invention have many advantages, including providing a discontinuous lignocellulose fiber reinforcing filler for thermoplastic composite compositions which significantly improves the tensile and flexural properties of the composite. Such improvement is comparable to that obtained by other moldable compositions including the more-expensive chemical thermo-mechanical hardwood pulp. However, the present invention's use of thermo-mechanical pulp discontinuous lignocellulose fiber is more cost effective than using chemical thermo-mechanical discontinuous cellulose pulp with similar tensile property performance. Moreover, the source of the component materials of the composite composition may be waste wood and recycled thermoplastic, and the processes for manufacturing the fiber filler and composite are conventional. Thus, the present invention is a significant advance in thermoplastic composite technology in terms of both cost and performance.

While the present invention has been described in considerable detail in connection with preferred embodiments thereof, it will be understood, of course, that I do not intend to limit the invention to those embodiments since modifications may be made by those skilled in the art, particularly in light of the foregoing teachings. For example, numerous combinations of wood fiber sources and thermoplastic are possible within the scope of the disoclosure. It is intended to cover all alternatives, modifications and equivalents as may be included within the spirit and scope of the invention as defined by the appended claims. It is, therefore, contemplated to cover by the appended claims any such modifications as incorporate those features which constitute the essential features of these improvements within the true spirit and the scope of the invention.

I claim:

1. A discontinuous lignocellulose fiber reinforcing filler for thermoplastic composite compositions, the filler comprising at least about 20 percent by weight of discontinuous lignocellulose fibers having a length of at least about 15 millimeters and a diameter of less than about 0.5 millimeters, and wherein the particle size distribution of the fiber as percent by total weight of the fiber filler withheld on ASTM screens is about 20 to about 50 percent withheld on an eight mesh screen, about 20 to about 40 percent withheld on a sixteen mesh screen, about 20 to about 30 percent withheld on fifty mesh screen, and about 10 percent finer than a fifty mesh screen.

2. The discontinuous lignocellulose fiber filler as recited in claim 1, wherein the fiber filler is derived from a softwood tree species.

3. The discontinuous lignocellulose fiber filler as recited in claim 1, wherein the fiber filler is derived from a hardwood tree species.

4. The discontinuous lignocellulose fiber filler as recited in claim 1, wherein the fiber is derived from a virgin wood source.

5. The discontinuous lignocellulose fiber filler as recited in claim 1, wherein the dry weight composition of the discontinuous lignocellulose fiber is approximately 27 percent lignin, 23 percent hemicellulose and 45 percent cellulose.

6. The discontinuous lignocellulose fiber filler as recited in claim 1, wherein the diameter of the at least about 20 percent by weight of discontinuous lignocellulose fibers having a length of at least about 15 millimeters is at least about 0.1 millimeters.

7. The discontinuous lignocellulose fiber filler as recited in claim 1, wherein the diameter of the at least about 20 percent by weight of discontinuous lignocellulose fibers having a length of at least about 15 millimeters is between about 0.1 millimeters and about 0.5 millimeters.

8. The discontinuous lignocellulose fiber filler as recited in claim 1, wherein the moisture content of the fiber filler is sufficiently low that blisters do not form in a molded composite including the fiber filler.

9. The discontinuous lignocellulose fiber filler as recited in claim 1, wherein the moisture content of the fiber filler is less than about 5 percent by weight of the fiber filler.

* * * * *